Figure 1:
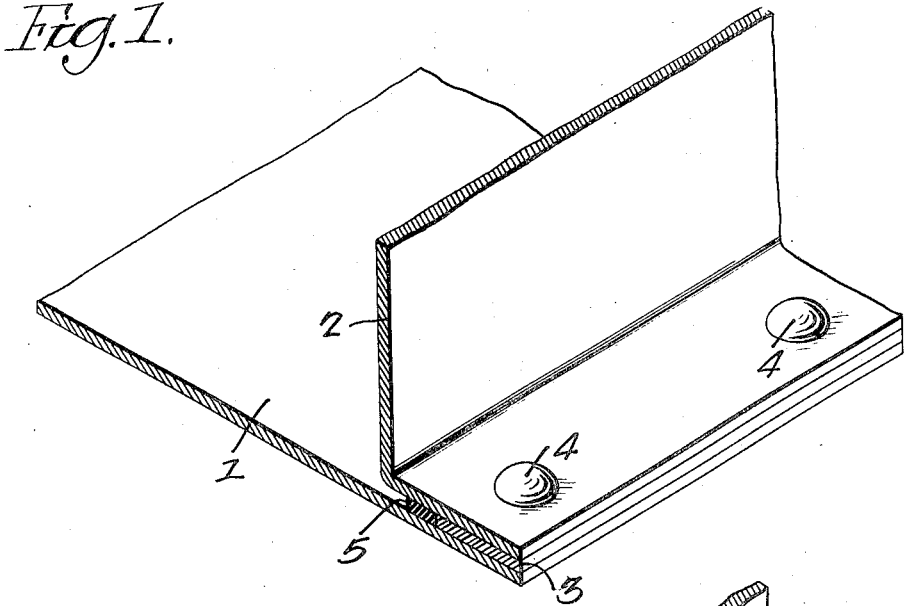

Oct. 26, 1926.

J. H. SKITT

JOINT FOR DYE TANKS

Filed Feb. 27, 1925

1,604,855

Inventor.
James H. Skitt.
by his Attorneys.
Howson & Howson

Patented Oct. 26, 1926.

1,604,855

UNITED STATES PATENT OFFICE.

JAMES H. SKITT, OF PHILADELPHIA, PENNSYLVANIA, ASSIGNOR TO SMITH, DRUM & COMPANY, OF PHILADELPHIA, PENNSYLVANIA, A COPARTNERSHIP CONSISTING OF ROBERT P. SMITH AND GEORGE E. DRUM.

JOINT FOR DYE TANKS.

Application filed February 27, 1925. Serial No. 12,105.

The invention relates to water-tight sheet metal tanks such as used in certain forms of dyeing apparatus, and the principal object of the invention is to provide novel constructional means whereby it is possible to provide a tank of light sheet metal generally stronger and more durable and less liable to develop leaks of a character difficult to repair than tanks constructed in accordance with previous practices.

The invention resides in the provision of a novel form of joint or seam made water-tight without application of heat, as required for welded or brazed joints, and more durable, particularly in dye tanks, than soldered joints.

Since the tank itself may be of any desired form, I have illustrated in the attached drawings, only those portions of a tank essential to an understanding of the invention.

Figure 2:
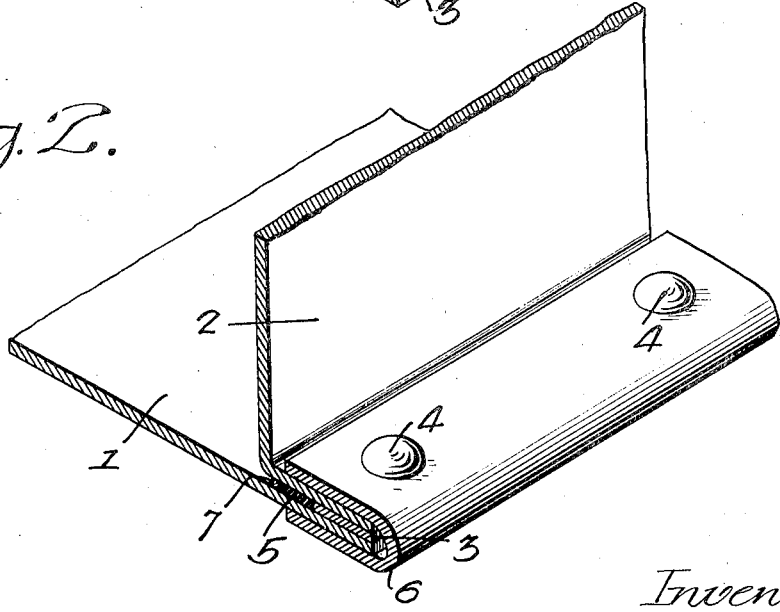

In the drawings, therefore:

Figure 1 is a view in perspective of a fragment of a tank including a joint or seam made in accordance with my invention, and Fig. 2 is a similar view illustrating a modification within the scope of the invention.

With reference to the drawings, 1 and 2 indicate respectively parts of two plates of a fabricated sheet metal tank where they are secured together, forming a joint or seam. The edges of the plates 1 and 2 are spaced apart by means in the present instance of a single spacer plate or strip 3, and are fastened together by rivets 4 which pass through the said plates and also through the strip 3. There may be some variation in the spacing means, although a solid strip is preferred, and there must be sufficient space intermediate the parallel portions of the plates between which the spacer lies for reception on the inside of a packing strip 5 which may be caulked into the space after the joint is otherwise completed. This packing 5 may be of any suitable material, but for dye tank purposes should be of material such as rubber not affected by chemicals commonly employed in dyeing operations.

In Fig. 2, the joint is protected and finished by means of a binding strip 6 secured over the edges of the plates by the same rivets 4 which bind the edges together. In this instance, the packing 5 is protected and reinforced by non-corrosive wire, 7, forced into the recess behind the packing.

There is to be no implied limitation as to the character of the packing, which may be of any material, either metallic or non-metallic, that may be found suitable.

The usual methods of making water-tight joints have been by brazing or welding the plates together or soldering. The life of a soldered joint is short, due to the corrosive action of acids in dye liquors; while application of the high temperatures required for brazing and welding weakens the thin sheet metal at or around the joint due to uneven expansion and contraction. Burning also is apt to occur by too long application of the welding torch at one spot. The thin sheets thus weakened are liable at any time to crack and cause leaks which are very expensive to repair.

By employing a seam or joint of the type described herein, it is possible to eliminate these serious defects in sheet metal tanks as heretofore constructed, particularly in tanks for dyeing apparatus. The joint eliminates the necessity for an application of heat and provides a joint which is considerably more durable than a soldered joint and one also that is easily repaired in the event of developing a leak. Furthermore, whereas a brazed or welded or even a soldered joint requires the services of skilled men, a joint made in accordance with my invention may be packed or re-packed in a much shorter time by the ordinary mechanic.

I claim:

A joint for fabricated sheet metal dye tanks consisting of the edges of two plates laid together with an intermediate member holding them in spaced relation, means for securing the plates together with the spacer, a packing forced into the space between the plates from the inside, and a non-corrodible metal strip forced into said space behind said packing.

JAMES H. SKITT.